(12) United States Patent
Tarbell

(10) Patent No.: US 10,978,859 B2
(45) Date of Patent: Apr. 13, 2021

(54) WIRE TIP CLIPPING TOOL AND METHOD OF USING SAME

(71) Applicant: Nonconductive Tool Company, LLC, Torrance, CA (US)

(72) Inventor: Warren Tarbell, Torrance, CA (US)

(73) Assignee: NONCONDUCTIVE TOOL COMPANY, LLC, Torrance, CA (US)

( * ) Notice: Subject to any disclaimer, the term of this patent is extended or adjusted under 35 U.S.C. 154(b) by 350 days.

(21) Appl. No.: 15/975,640

(22) Filed: May 9, 2018

(65) Prior Publication Data

US 2018/0331514 A1 Nov. 15, 2018

Related U.S. Application Data

(60) Provisional application No. 62/503,885, filed on May 9, 2017.

(51) Int. Cl.
*H02G 1/00* (2006.01)
*H02G 3/04* (2006.01)

(52) U.S. Cl.
CPC .............. *H02G 1/005* (2013.01); *H02G 3/04* (2013.01)

(58) Field of Classification Search
CPC .................................. H02G 1/005; H02G 3/04
USPC ........................... 29/757, 758, 760, 748, 750
See application file for complete search history.

(56) References Cited

U.S. PATENT DOCUMENTS

| | | | | |
|---|---|---|---|---|
| 2,821,293 A * | 1/1958 | Campbell | .............. | B21D 49/00 29/728 |
| 4,148,138 A * | 4/1979 | Becker | .................... | H01R 43/01 29/566.3 |
| 4,756,078 A * | 7/1988 | Dougherty | ......... | H05K 13/0491 29/268 |
| 5,187,851 A * | 2/1993 | Klinger | .................... | B25B 27/10 285/308 |
| 5,274,909 A * | 1/1994 | Listing | .................... | H01R 43/04 29/751 |
| 5,718,037 A * | 2/1998 | Gale | ........................ | H02G 1/14 269/2 |
| 5,771,945 A * | 6/1998 | Jenner | .................... | H01R 43/28 140/123 |
| 6,202,295 B1 * | 3/2001 | Easter | .................. | H01R 43/205 29/762 |
| 6,298,548 B1 * | 10/2001 | Suarez | .................. | H01R 43/01 29/566.3 |

(Continued)

*Primary Examiner* — Peter Dungba Vo
*Assistant Examiner* — Kaying Kue
(74) *Attorney, Agent, or Firm* — Sheppard, Mullin, Richter & Hampton LLP

(57) ABSTRACT

Embodiments disclosed herein include devices and methods for securely clipping the tip of an electrical wire. The wire tip clipping tool may include an opening and closing mechanism, and a member coupled to the opening and closing mechanism. The member can include a top portion and a bottom portion moveably coupled such that an opening is formed between the top portion and bottom for receiving at least a portion of an electrical wire inserted into the opening. The top portion and bottom portion may move towards each other, with respect to movement of the opening and closing mechanism, to a closed position for clipping the received portion of the electrical wire, restricting movement of the electrical wire and preventing conductive contact with the received portion of the electrical wire.

17 Claims, 4 Drawing Sheets

(56) References Cited

U.S. PATENT DOCUMENTS

| | | | | |
|---|---|---|---|---|
| 7,035,519 | B2* | 4/2006 | Segroves | B25B 7/12 385/134 |
| 7,444,744 | B2* | 11/2008 | Caveney | H01R 43/0421 29/566.4 |
| 7,685,702 | B2* | 3/2010 | Sutter | B25B 27/10 29/566.3 |
| 8,418,347 | B2* | 4/2013 | Chen | H01R 43/015 29/566.4 |
| 8,855,458 | B2* | 10/2014 | Belenkiy | G02B 6/3898 385/137 |
| 2006/0000072 | A1* | 1/2006 | Frenken | H01R 43/0427 29/237 |
| 2006/0179647 | A1* | 8/2006 | Montena | H01R 43/0421 29/751 |
| 2012/0090170 | A1* | 4/2012 | McCaskey | H01R 43/015 29/755 |
| 2013/0228047 | A1* | 9/2013 | Yang | H02G 1/1214 81/9.44 |
| 2014/0345061 | A1* | 11/2014 | Lingmann | B25B 7/08 7/107 |
| 2015/0162670 | A1* | 6/2015 | Galla | H01R 43/01 29/872 |

* cited by examiner

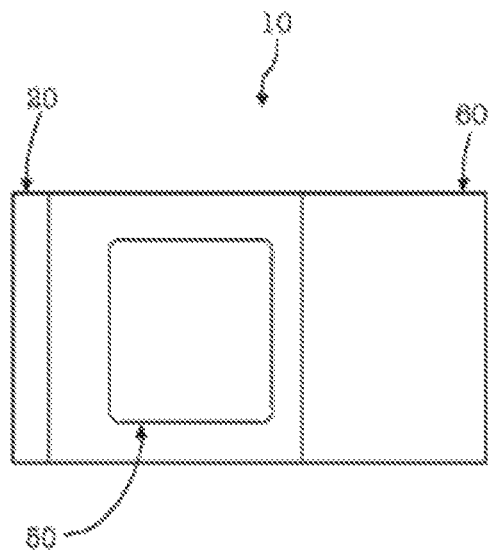
FIG. 2A
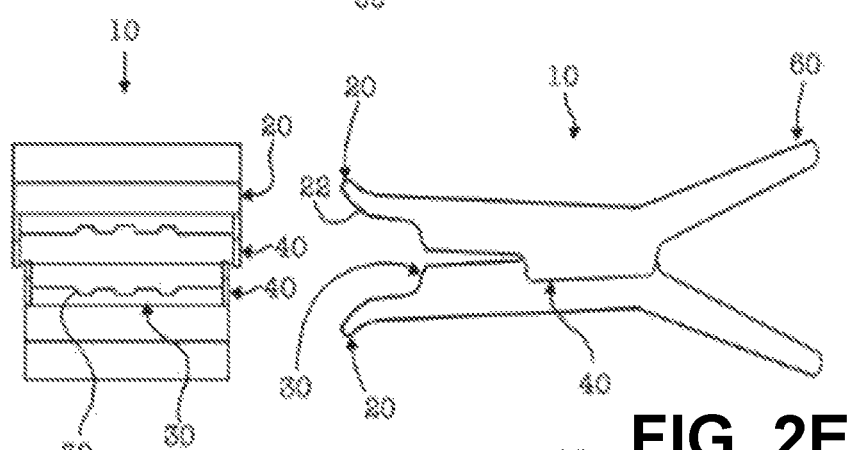
FIG. 2C
FIG. 2E
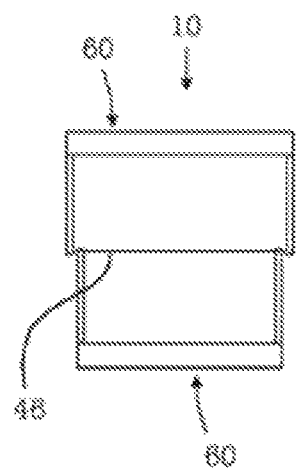
FIG. 2D
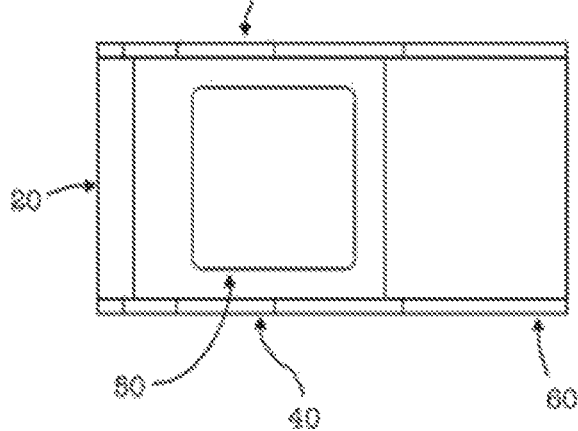
FIG. 2B

FIG. 3A
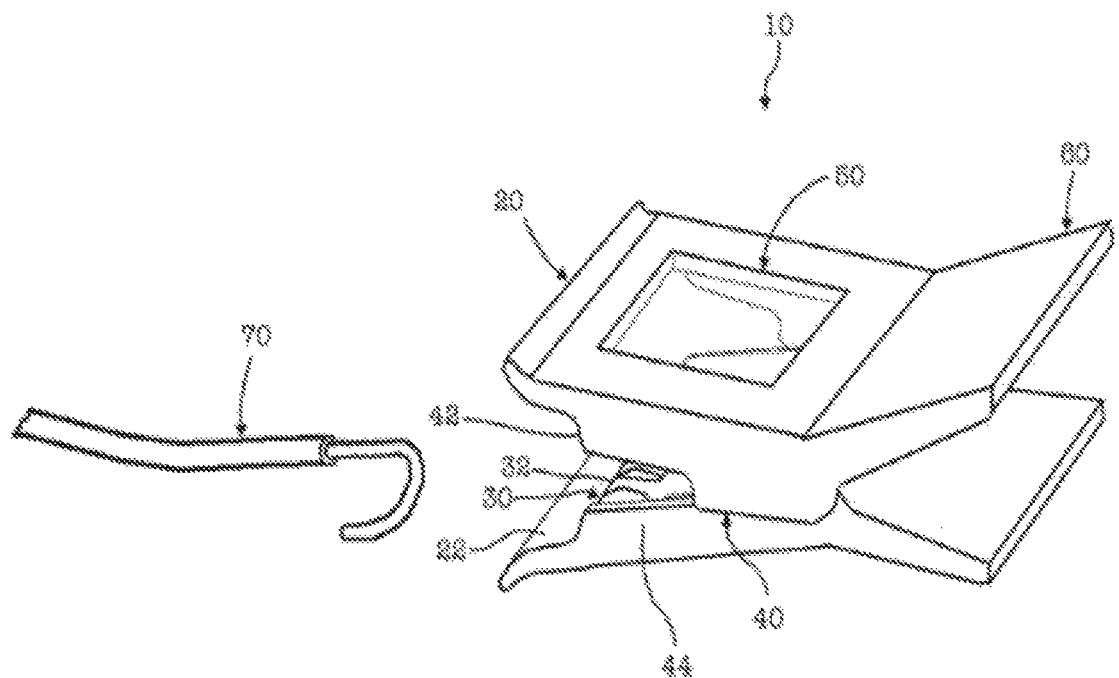
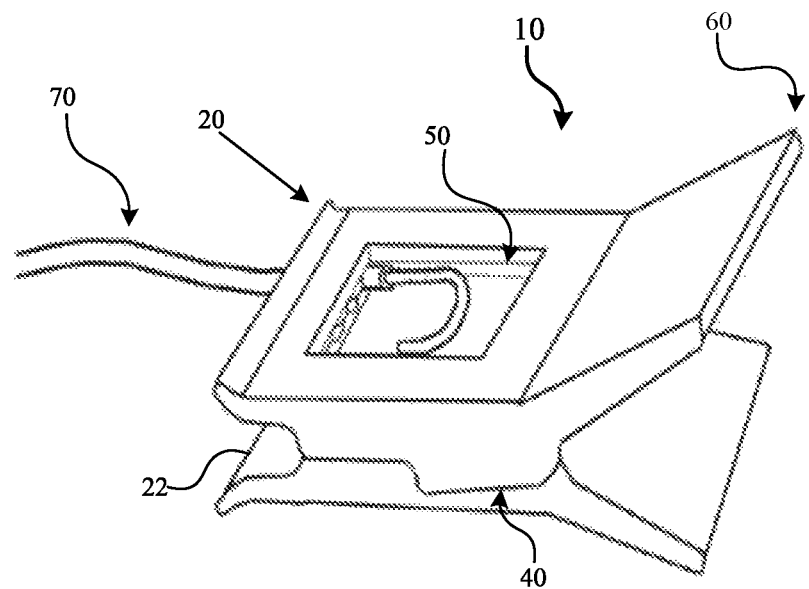
FIG. 3B

WIRE TIP CLIPPING TOOL AND METHOD OF USING SAME

CROSS-REFERENCE TO RELATED APPLICATIONS

This application claims the benefit of U.S. Provisional Patent Application Ser. No. 62/503,885, filed May 9, 2017. This application hereby incorporates herein by reference, the complete contents of the above referenced U.S. Provisional Patent Application, in its entirety.

TECHNICAL FIELD

The disclosed technology relates generally to electrical tools, and more particularly, some embodiments relate to a wire tip clipping tool and methods of using the same.

DESCRIPTION OF THE RELATED ART

Electrical workers are often considered to be engaged in a very dangerous profession. Electrical workers are tasked with working on high voltage, high current electrical circuits. Although electrical workers take many precautions against the risk of shock, accident still occur. Miswiring of the circuit or mislabeling of junction boxes and components can cause an electrician to be exposed to a live circuit even after he or she has taken reasonable steps to turn off the circuit. To exacerbate this problem, electrical workers are often required to manipulate electrical components with their hands or with metal tools. For example, to pull an electrical socket out of a wall box, electricians often use their hands. Consequently, they might accidentally touch the electrical posts carrying electricity to the socket. Furthermore, electrical components, for example wires and terminals, may unintentionally come into contact with other electrical devices, or junction boxes, while the device is being installed in or removed. Accidental contact between conductors can cause various hazardous conditions, such as an arc fault, which is a high-power discharge of electricity that can translate into heat and potentially trigger an electrical fire.

BRIEF SUMMARY OF EMBODIMENTS

According to various embodiments of the disclosed technology, an electrical device shield tool is described. According to one embodiment, the wire tip clipping may include: an opening and closing mechanism; and a member coupled to the opening and closing mechanism, the member comprising: a top portion and a bottom portion moveably coupled such that an opening is formed between the top portion and bottom, wherein the top portion and the bottom portion move away from each, with respect to a movement of the opening and closing mechanism, to an open position for receiving at least a portion of an electrical wire inserted into the opening, and move towards each other, with respect to another movement of the opening and closing mechanism, to a closed position for clipping the received portion of the electrical wire.

Other embodiments may include a contoured gripping area for the tool, comprising insulation material that forms gripping contact with the wire tip, thereby holding the wire in a secure position, in a manner that reduces the risk of accidental contact.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "front," "back," "bottom" or "side" views, such references are merely descriptive and do not imply or require that the disclosed technology be implemented or used in a particular spatial orientation unless explicitly stated otherwise.

FIGS. 2A-2B are a top and bottom view, respectively, of the example wire tip clipping tool illustrated in FIG. 1.

FIGS. 2C-2D are a front and back view, respectively, of the example wire tip clipping tool illustrated in FIG. 1.

FIG. 2E is a side view of the example wire tip clipping tool illustrated in FIG. 1.

FIGS. 3A-3B are diagrams illustrating the example wire tip clipping tool in operation with a wire, in accordance with one embodiment of the technology described herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for clipping a portion of an electrical wire, such as the tip of the wire, which may be stripped of insulation exposing a conductive core of the wire. The wire tip clipping tool can securely hold the wire, restricting movement of the wire during operations such as, for example, removal, installation or handling of an electrical device including the wire. Moreover, the wire tip can be enclosed by an insulation layer lining the inner surfaces of the tool, to prevent accidental contact with other electrical components, such as other wires, or humans.

The wire tip gripping tool is dimensioned to, at least, include two portions which comprise a main member of the tool. The potions may be panels connected at one end, and disconnected at the opposing end forming a "clip" structure. The portions can moveably open apart to receive the wire tip, and collapse together to clip, or otherwise hold, the wire tip, with respect to moving an opening and closing mechanism. Accordingly, a wire tip can be placed within the grasp of the tool, and remain stable, and clipped place while various operations involving the electrical device are completed.

The tool includes an opening and closing mechanism for moving portions of the main member. The opening and closing mechanism can be implemented according to various embodiments, including, but not limited to: a clip grip; a slide tightening grip; a cam tightening grip; and other mechanisms.

Figure 1:
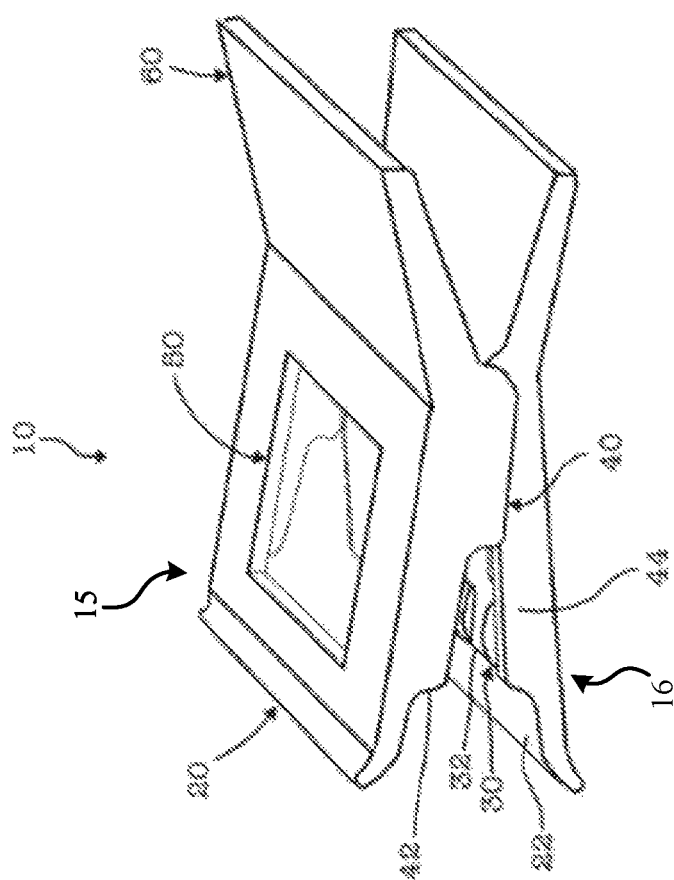
FIG. 1 is a diagram illustrating a perspective view of an example of a wire tip clipping tool, in accordance with one embodiment of the technology described herein.

FIG. 1 is a diagram illustrating a perspective view of an example of a wire tip clipping tool 10, in accordance with one embodiment of the technology described herein. As seen, the wire tip clipping tool 10 can include a main member, comprised by to portions generally described as flat panels, and referred to herein as a top portion 15 and bottom portion 16. The tool 10 is configured such that the top portion 15 and bottom portion 16 are connected to each other at one end, for instance at a hinged joint, while remaining disconnected at the opposing end. Thus, the wire tip clipping tool 10 can be designed having a main member described as a "clip" structure, as the top portion 15 and bottom portion 16 can pivot from the attached end. For example, the top portion 15 and the bottom portion 16 can move away from each other forming an open angle between the portions. Conversely, the top portion 15 and bottom portion 16 can collapse together from the hinged joint, thereby closing the "jaws" of the clip. As another example, the internal geometry of the wire tip clipping tool 10 may form a V or otherwise have a tapered geometry such that wires of a range of thicknesses can be accepted and held in place by the tool 10.

FIG. 1 shows the wire tip clipping tool 10 in, at least, a partially open position illustrating an internal surface that includes a contoured wire gripping area 30. Conversely, the top and bottom portions 15, 16 of the tool 10 can move towards each other to close. In a closed position, the top potion 15 and bottom portion 16 lay relatively parallel, or restated, lay on top of each other such that their respective internal surfaces come into contact. Accordingly, as the wire tip clipping tool 10 opens, for example, by applying pressure (e.g., squeezing) to the grips of an opening and closing mechanism 60 the open tool 10 can receive a tip of a stripped (or unstripped) wire. In the illustrated example, the open and closing mechanism 60 is arranged at the rear end of the tool 10, such that the mechanism 60 is at an end opposing the open end of the tool 10 separated longitudinally across the length of the tool 10.

Also, shown in FIG. 1, the wire tip clipping tool 10 can be configured to include multiple wire encapsulation shields 40. The wire encapsulation shields 40 are designed to enclose and additionally constrict a wire within the grasp of the tool 10, thereby further securing the wire. In the illustrated example, top wire encapsulation shields 42 are generally flat surfaces, or lateral panels, that extend from both sides of the top portion 15 and the bottom potion 16 towards the opening (e.g., in the direction of the internal surfaces). These lateral panels, or wire encapsulation shields 40, form edges that are substantially perpendicular to the top and bottom of the tool 10. The top wire encapsulation shields 42 have a length that continues for, at least, a substantial part of a length of the top portion 15. Accordingly, the top wire encapsulation shields 42 can act as parallel walls, which serve to "close off" the tool by obstructing the tool's sides and reduce the potential of a wire slipping loose from either side of the tool 10.

The bottom wire encapsulation shields 44 has a structure that is similar to that described for the top wire encapsulation shields 42, but the bottom wire encapsulation shields 42 extend upwards from the bottom portion 16 of the tool 10. The top wire encapsulation shields 42 and the bottom wire encapsulation shields 44 are dimensioned to contact, or otherwise overlap, each other, creating a barrier horizontally along the length of the tool 10 that can prevent the wire from unintentionally escaping from its sides. Furthermore, the tool 10 can include rear wire encapsulation shields 46, shown in FIG. 2D. As a general description, the rear wire encapsulation shields 46 functions in a manner similar to the previously described shields, but extended substantially perpendicularly from a rear surface of the top portion and the bottom portions at the rear end of the member. Accordingly, the rear wire encapsulation shields 46 to enclose the back section of the tool 10, for instance near the opening and closing mechanism 60, such that the wire does not come loose from the rear of the tool 10.

FIGS. 2A-2E show alternative views of the example wire tip clipping tool 10 illustrated in FIG. 1. In particular, FIGS. 2A-2B are a top and bottom view, respectively, of the example wire tip clipping tool 10. FIGS. 2C-2D are a front and back view, respectively, of the example wire tip clipping tool illustrated in FIG. 1. Lastly, FIG. 2E is a side view of the example wire tip clipping tool 10.

With reference now to FIG. 1 and FIGS. 2A, 2D, 2E, the example wire tip clipping tool 10 includes an opening and closing mechanism 60. In this example, the opening and closing mechanism 60 is shown as a clip grip. As an example, a clip grip functions similar to a lever. In an initial, or resting, position the tool 10 is configured to be closed, as the top portion 15 and bottom portion 16 lay parallel, pressing firmly against each other. When force is applied to the clip grip, for instance pressure from squeezing the grips, both the top and bottom portions 15, 16 of the tool 10 can pivot from a fulcrum, which can be a hinged point near the rear of the tool 10. This pivoting motion causes the top portion 15 of the tool 10 to swing upward, or vertically from the hinged point (e.g., along the positive y-axis). Alternatively, the bottom portion 16 of the tool 10 pivots vertically downward from the hinged point (e.g., along the negative y-axis).

In concert, the portions of the tool 10 move away from each other to configure the tool in an opened position. When pressure previously applied to the clip grip is released, each portion 15,16 pivots in a respective opposite direction from the fulcrum (e.g., top portion swings downwards and bottom swing upwards) to move towards each other, and return to the closed position. Although the opening and closing mechanism 60 is illustrated as a clip grip in this example, it should be appreciated that the mechanism 60 can be constructed using any mechanical means capable of moving the main portions of the tool 10 either away from each other or towards each other, such that the tool 10 clamps (in a closed position) and releases (in an open position). FIG. 1, FIGS. 2A-2E, FIGS. 3A-3B, and FIG. 4A particularly illustrate the embodiment of the example clip tip gripping tool 10 including a grip clip as the opening and closing mechanism 60 (which is the embodiment discussed in referring to FIG. 1). Alternate embodiments for the wire tip clipping tool 10 including varying implementations of the opening and closing mechanism 60 are discussed in referring to FIGS. 4B and 4C. The open and closing mechanism 60 of the wire tip clipping tool 10 can be implemented by a plurality of tightening mechanisms including, but not limited to: a clip grip; a slide tightening grip; a cam tightening grip, and the like.

Referring now to FIG. 1 and FIG. 2C, the wire tip clipping tool 10 may include a wire gripping area 30 comprised by the inner surfaces (e.g., the contacting surfaces) of the top and bottom portions 15, 16 of the tool 10. In the illustrated example, the wire gripping area 30 is structured to include various elements, for instance a contoured opening 32 and contoured insertion opening 20, to improve the wire receiving and wire gripping aspects of the tool 10. For instance, the contoured opening 32 of the wire gripping area 30 has a generally curved shape, that may increase firmness and gripping as curved surfaces come into contact while the tool 10 is clamped shut (in comparison to the contact that may be experienced by relatively flat surfaces).

Moreover, the wire gripping area 30 can include an insulation layer disposed thereon. The insulation layer can be constructed using a rubber-like material, for example, that covers all or portions of the internal surfaces of the tool 10, namely the wire gripping area 30. In some instances, soft rubber layers disposed along the top and bottom portions 15, 16 come into contact when the tool 10 is in a closed position, causing friction. This friction from the insulation layer, rubber in this case, may increase the gripping effect of the portions to each other, and the overall grip of the tool 10 on the wire. Although rubber is disclosed for purposes of discussion, in other embodiments the insulation layer can include various insulation materials, for example rubberlike materials, plastics, foams, polymers, and the like, capable of achieving the same gripping functions described above. Furthermore, the tool 10 including an insulation layer, can reduce the risk of hazards associated with an exposed electrical wire (e.g., contacting other electrical components, or humans).

Additionally, in the illustrated example, the contoured opening 32 may include surfaces that are ridged, or otherwise dimensioned, such that the internal surfaces of the tool 10 may further the wire for a more secure hold. Referring to FIG. 1 and FIG. 2C, the contoured opening 30 is shown to include ridged surfaces, which may be generally round in shape. The ridges can serve to increase the frictional contact of the tool 10 while it is closed, and create indentations between the ridges that further grip an enclosed wire. In other embodiments, various other textured or raised surfaces may be used to construct the contoured opening 30, which serve to increase the friction hold of the wire and improve the grip of the tool.

Referring now to FIG. 1, and FIGS. 2A-2E, the wire tip clipping tool 10 can include a contoured insertion opening 20. Particularly, in FIG. 1, the contoured insertion opening 20 is illustrated at the front of the wire tip clipping tool 10, or an opposing end in relation to the opening and closing mechanism 60. Also seen, in FIG. 2E, are guiding edges 22, which can be described as protruding edges, or lips, that extend from the top and bottom portions 15, 16 of the tool 10. The contoured insertion opening 20 is dimension such that the curved shaped, including the guiding edges 22 which are also curved in a flared configuration, may ease insertion by guiding the wire in a direction towards, and subsequently into, the opening. Preferably, the guiding edges 22 and contoured insertion opening 20 are configured to guide the wire into an area that is generally center of the tool 10.

In the illustrated example, the wire tip clipping tool 10 can include a wire tip viewing portal 50. The perspective shown in FIG. 1 illustrates the wire tip viewing portal 50 in the top portion 15 of the tool 10, which in general, serves as a clear window for the tool 10. Although FIG. 1 shows the wire tip viewing portal 50 in the top portion 10, it should be appreciated that the wire tip clipping tool 10 may have wire tip viewing portal 50 in both the top portion 15 and bottom portion 16 of the tool, illustrated in FIGS. 2A-2B. Referring back to FIG. 1, the wire tip viewing portal 50 may be an opening along the exterior surface on a top portion 15 of the tool 10, and having a depth down through to the internal surface of that portion, thereby allowing a wire to be visible while being received and held (and within the grasp) by the tool 10 in the internal wire gripping area 30. In the example, the wire tip viewing portal 50 can be generally described as having a square shape. Nonetheless, it is readily recognized that the wire tip viewing portal 50 can be configured using various geometries that are preferably sized to increase visibility and assist during operations of the tool 10, such as wire alignment, and viewing an orientation of the wire tip. For example, the wire tip viewing portal 50 can be an open space (e.g., exposed area), or constructed from a substantially transparent material, for example a clear plastic, such that the wire tip viewing portal 50 is see-through for a human, while in use. In an embodiment, the entire tool 10 can be constructed from a transparent material allowing similar visibility as described relating to the wire tip viewing portal 50.

FIGS. 3A-3B are diagrams illustrating the example wire tip clipping tool in operation with a wire 70, in accordance with one embodiment of the technology described herein. In the illustrated example, the wire 70 has been stripped of the insulation at its end, leaving a tip that exposes the conductive material. Referring back to an example of a stripped solid-core copper wire, the tool 10 can cover, at least, the tip of the wire 70 having an otherwise uncovered conductive material, which is copper in this case. In FIG. 3A, the wire tip clipping tool 10 is shown in an open position, receiving wire 70. As described in detail in reference to FIG. 1, the tool 10 may be opened by applying pressure to the opening and closing mechanism 60. In accordance with the grip clip embodiment, a user can squeeze together the ends of the grip, thereby moving the top portion 15 and bottom portion 16 of the tool 10 away from each other. Subsequently, the wire 70 can be guided using various means, including the contoured insertion opening 20, and the guiding edge 22, for insertion inside of the tool 10. FIG. 3B illustrates the wire 70 while being gripped by tool 10 (e.g., placed inside of the wire gripping area 30). In some cases, the wire gripping area 30 is preferably dimensioned to multiple wires 70 of various gauges. For example, the tool 10 can clip four wires, having 8, 10, 12, and 14 AWG respectively. In accordance with this embodiment, multiple tools 10 can be constructed to have distinct and varying sizes, in anticipation of the related application(s).

The illustrated example shows that the wire tip viewing portal 50 allows the wire 70 to remain visible, even as it is in the grasp of the tool 10. While closed, the wire tip clipping tool 10 can securely hold the wire 70, preventing the wire 70 from moving and causing various hazardous conditions. According to the embodiments, the tool 10 can be nonconductive such that it reduces the risk of accidental exposure to the conduction of energy, for example electrical shock, should the wire 70 be energized while engaged by the tool 10. As an example, the elastomeric properties of the tool 10 may provide sufficient flexibility and resilience to allow the wire tip clipping tool 10 to accept and retain wires of various thicknesses. As seen in FIG. 3B, the wire gripping area 30 is dimensioned to conform to the geometry and configuration of the wire 70 that it is intended to grip. This may be due to the soft, insulation layer, lining the wire gripping area 30.

Moreover, in some embodiments, the wire tip clipping tool 10 is dimensioned for easy gripping. For example, the bottom portion of the tool may include grooves that allow a human to place their fingers on the bottom of the tool, in order to improve the grip. The improved gripping can further allow a human to more easily provide resistance in clamping and/or releasing the tool, for instance remaining stably gripped in-hand as the thumb pushes or pulls on the open and closing mechanism 60.

Figure 4A:
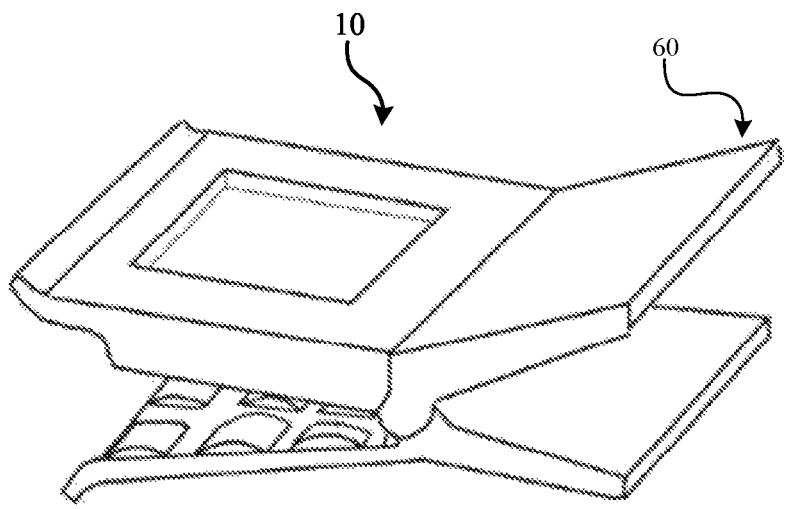
FIG. 4A is a diagram illustrating the example wire tip clipping tool, including a clip grip implementation of the opening and closing mechanism, illustrated in FIG. 1.
Figure 4B:
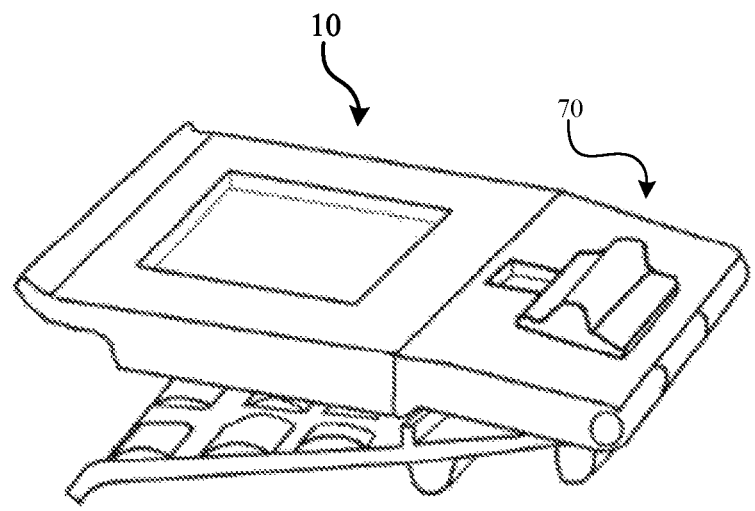
FIG. 4B is a diagram illustrating an example wire tip clipping tool, including a slide tightening grip implementation of the opening and closing mechanism, in accordance with one embodiment of the technology described herein.
Figure 4C:
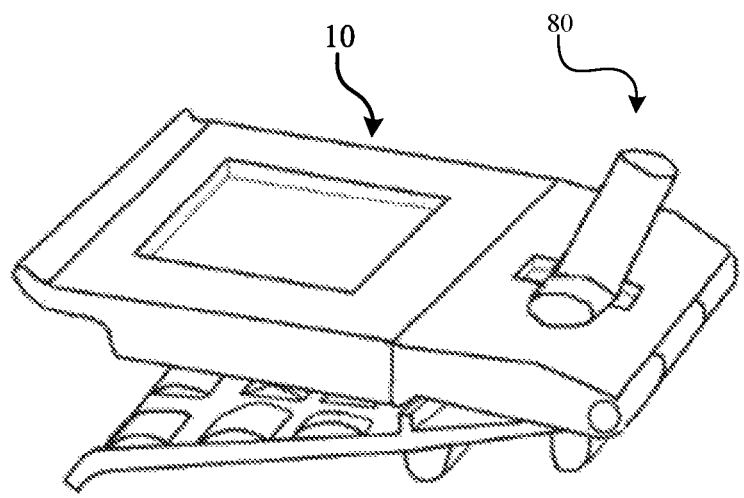
FIG. 4C is a diagram illustrating another example wire tip clipping tool, including a cam tightening grip implementation of the opening and closing mechanism, in accordance with one embodiment of the technology described herein.

As discussed referring to FIG. 1, the opening and closing mechanism 60 can be implemented using various mechanical means that are capable of causing movement of the top potion and bottom portions of the tool 10, which configures the tool 10 in an open position or closed position, as desired. FIGS. 4A-4C illustrate various embodiments for the opening and closing mechanism for the tool 10.

FIG. 4A is a diagram illustrating the example wire tip clipping tool 10, including a clip grip 60 implementation of the opening and closing mechanism, as discussed in referring to FIG. 1-FIG. 3B.

FIG. 4B is a diagram illustrating another example wire tip clipping tool 10, including a slide tightening grip 70 implementation of the opening and closing mechanism. In this embodiment, the slide tightening grip 70 can be used to securely lock the tool 10 into the closed position relative to a slidable movement of the slide tightening grip 70. For instance, a thumb pushing the slide tightening grip 70 mechanism forward (e.g., towards the opening) can cause movement of the portions of the tool 10 to close and lock in the position.

FIG. 4C is a diagram illustrating yet another example wire tip clipping tool 10, including a cam tightening grip 80 implementation of the opening and closing mechanism, in accordance with one embodiment of the technology described herein. According to this embodiment, the cam tightening grip 80 can be used to securely lock the tool 10 into the closed position relative to a movement of the cam tightening grip 80. In an example, employing the cam grip 80 can involve moving a handle for the cam 80 to move the portions of the tool 10, such pushing the handle forward (e.g., towards the opening) to lock the tool 10 in the closed position, and pulling the handle backwards (e.g., away from the opening) to open the tool 10.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A wire tip clipping tool comprising:
an opening and closing mechanism; and
a member coupled to the opening and closing mechanism, the member comprising:

a top portion and a bottom portion moveably coupled such that an opening is formed between the top portion and bottom, wherein the top portion and the bottom portion move away from each, with respect to a movement of the opening and closing mechanism, to an open position for receiving at least a portion of an electrical wire inserted into the opening, and move towards each other, with respect to another movement of the opening and closing mechanism, to a closed position for clipping the received portion of the electrical wire; and a section constructed from a transparent material within the top portion or the bottom portion, such that the received portion of the electrical wire is visible during the receiving and clipping.

2. The wire tip clipping tool of claim 1, wherein the clipping encloses the received portion of the electrical wire by gripping contact with internal surfaces of the top portion and the bottom portion, restricting movement of the electrical wire and preventing conductive contact with the received portion of the electrical wire.

3. The wire tip clipping tool of claim 2, wherein the internal surfaces of the top portion and the bottom portion comprise insulation material that form the grip while in gripping contact with the received portion of the electrical wire.

4. The wire tip clipping tool of claim 3, wherein the insulation material forms an insulation layer while clipping the received portion of the electrical wire.

5. The wire tip clipping tool of claim 1, wherein the member further comprises: lateral panels extending substantially perpendicularly from both sides of the top portion and the bottom portion, such that the lateral panels further restrict movement of the electrical wire relative to side surfaces of the member.

6. The wire tip clipping tool of claim 1, wherein the opening and closing mechanism is arranged at a rear end of the member opposing an end at the opening, separating the opening from the closing mechanism by a distance longitudinally across the length of the member.

7. The wire tip clipping tool of claim 6, wherein the member further comprises: rear lateral panels extended substantially perpendicularly from a respective rear surface of the top portion and the bottom portion at the rear end of the member, wherein the rear lateral panels further restrict movement of the electrical wire relative to surfaces at the rear end of the member opposing the opening.

8. The wire tip clipping tool of claim 1, wherein the opening comprises contoured dimensions for receiving the portion of the electrical wire.

9. The wire tip clipping tool of claim 1, wherein the top portion and the bottom portion comprise protruding edges extending outward from the end of the member at the opening for guiding insertion of the portion of the electrical wire into the opening.

10. The wire tip clipping tool of claim 1, wherein the opening and closing mechanism comprises at least one of: a clip grip, a cam tightening grip, and a slide tightening grip.

11. A wire tip clipping tool comprising:
an opening and closing mechanism; and
a member coupled to the opening and closing mechanism, wherein the opening and closing mechanism is arranged at a rear end of the member opposing an end at an opening to separate the opening from the opening and closing mechanism by a distance longitudinally across the length of the member, the member comprising:

a top portion and a bottom portion moveably coupled such that an opening is formed between the top portion and bottom, wherein the top portion and the bottom portion move away from each, with respect to a movement of the opening and closing mechanism, to an open position for receiving at least a portion of an electrical wire inserted into the opening, and move towards each other, with respect to another movement of the opening and closing mechanism, to a closed position for clipping the received portion of the electrical wire; and rear lateral panels extended substantially perpendicularly from a respective rear surface of the top portion and the bottom portion at the rear end of the member, wherein the rear lateral panels restrict movement of the electrical wire relative to surfaces at the rear end of the member opposing the opening.

12. The wire tip clipping tool of claim 11, wherein the clipping encloses the received portion of the electrical wire by gripping contact with internal surfaces of the top portion and the bottom portion, restricting movement of the electrical wire and preventing conductive contact with the received portion of the electrical wire.

13. The wire tip clipping tool of claim 12, wherein the internal surfaces of the top portion and the bottom portion comprise insulation material that form the grip while in gripping contact with the received portion of the electrical wire.

14. The wire tip clipping tool of claim 13, wherein the insulation material forms an insulation layer while clipping the received portion of the electrical wire.

15. The wire tip clipping tool of claim 11, wherein the member further comprises: a section constructed from a transparent material within the top portion or the bottom portion, such that the received portion of the electrical wire is visible during the receiving and the clipping.

16. The wire tip clipping tool of claim 11, wherein the member further comprises: lateral panels extending substantially perpendicularly from both sides of the top portion and the bottom portion, such that the lateral panels further restrict movement of the electrical wire relative to side surfaces of the member.

17. The wire tip clipping tool of claim 11, wherein the opening and closing mechanism comprises at least one of: a clip grip, a cam tightening grip, and a slide tightening grip.

* * * * *